Figure 1:
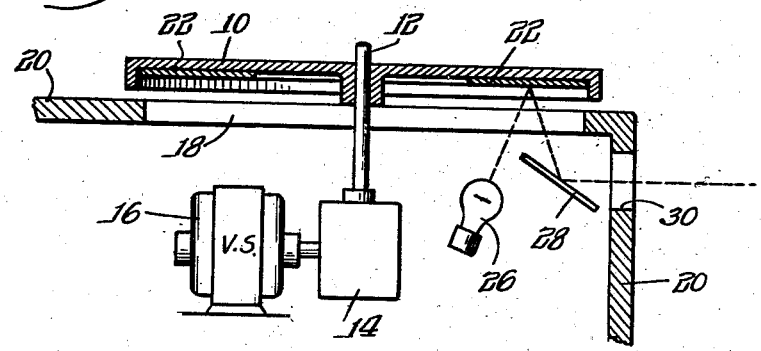

Sept. 24, 1946.　　　　W. L. NIES　　　　2,407,996
STROBOSCOPIC APPARATUS FOR PHONOGRAPHS
Filed Feb. 7, 1945

INVENTOR.
William L. Nies
BY
Loftus, Moore, Olson & Trexler
attys.

Patented Sept. 24, 1946

2,407,996

UNITED STATES PATENT OFFICE 2,407,996

STROBOSCOPIC APPARATUS FOR PHONOGRAPHS

William L. Nies, Wheaton, Ill.

Application February 7, 1945, Serial No. 576,630

4 Claims. (Cl. 88—14)

This invention relates to stroboscopic apparatus for use in connection with regulating the speed of rotation of a phonograph record, and it has for its object the provision of a new and improved arrangement of parts whereby the speed of the phonograph may readily be adjusted so as to cause the reproduction to be at precisely the same pitch as that at which the recording was effected.

At times a musician or a music pupil desires to play as a part of an ensemble and uses for this purpose a phonograph record of the selection, and sometimes a specially made record from which the part to be added has been omitted in the recording. In any such case, it is highly important that the reproduction be effected at the same speed as that at which the record was made, which is ordinarily at the rate of approximately 78.26 revolutions per minute. The exact rate at which recording is effected ordinarily is that at which a moving 92 step stroboscopic scale is made to appear stationary when illuminated by a lamp energized by 60 cycle alternating current. It is accordingly the object of this invention to provide an improved arrangement by which the reproduction may be effected easily and conveniently at precisely this same speed.

For effecting this result in the easiest and most satisfactory manner, at a minimum cost for apparatus and operation, a 92 step stroboscopic scale has been employed so as to rotate in synchronism with the record and in such position as to be shielded from the room illumination, a special source of intermittently flashing light being employed for illuminating the scale and involving 120 separate flashes per second. By placing the stroboscopic scale on the bottom face of the turntable by which the record is rotated and protecting the scale from the room lighting, a comparatively small neon glow lamp can be employed to advantage energized by 60 cycle alternating current, being adapted in the absence of other lighting to provide sufficient illumination for enabling the operator readily and easily to observe the scale for determination as to whether or not it appears to be moving. For facilitating the observation of this scale, a mirror is preferably employed for directing the reflection of a portion of the scale outwardly through a window opening in the housing by which the scale is shielded.

It is one of the objects of the invention to improve apparatus of this type in sundry details hereinafter pointed out. The preferred means by which the several objects have been attained is illustrated in the accompanying drawing, in which Fig. 1 is a diagrammatic vertical sectional view through a phonograph provided with the improved apparatus.

Figure 2:
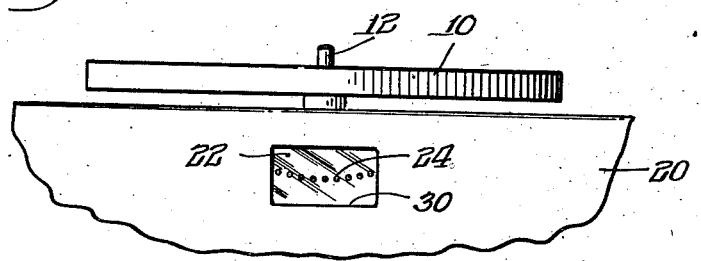
Figure 3:
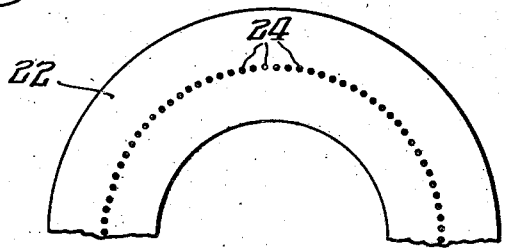

Fig. 2 is a face view of the structure of Fig. 1 as seen from the right in said figure; and Fig. 3 is a bottom face view of a portion of the ring by which a stroboscopic scale is attached to the bottom face of the turntable of the phonograph of Fig. 1.

Referring now to the several figures of the drawing, in which corresponding parts are indicated by the same reference characters, 10 indicates the turntable of a phonograph of any approved type, driven by a vertical shaft 12 connected through a suitable gear box 14 with the shaft of a variable speed motor 16. As shown, the turntable 10 is rotatably mounted above a large opening 18 in the top face of a housing 20 which serves to shield the bottom face of the turntable effectively from the room lighting.

On its bottom face, the turntable 10 is provided with an annular plate or ring 22 fixedly connected thereto, such ring 22 being provided on its bottom face in concentric position thereon with a 92 step stroboscopic scale 24, comprising 92 similar dots arranged in equally spaced relationship to each other about the ring. Below the ring 22 at one side, an electric lamp 26 is provided, such lamp being preferably a small neon glow lamp of a type adapted to be energized by 60 cycle alternating current for providing a small amount of light sufficient for illuminating the scale on the ring 22. A mirror 28 is also provided in position to reflect the image of a portion of the scale 24 outwardly through a window opening 30 in the face of the housing 20 below the ring.

With a record in position on the turntable, the motor 16 is energized for driving the turntable and the speed of the motor is adjusted for bringing the drive of the turntable and the record to precisely the desired speed, such result when effected being shown by the fact that under such circumstances the stroboscopic scale 24 appears to be stationary. By reason of the exclusion of the room light from the face of the scale 24, a fairly small amount of light from the lamp 26 is adequate for enabling the operator easily to determine when the adjustment of the motor is correct for holding the scale 24 apparently stationary. The arrangement is such also that during the playing of the record the operator is able readily to observe any deviation in the speed of rotation of the record, as shown by an apparent rotation of the scale as reflected through the window opening 30.

In case the lamps 26 were to be energized by an alternating current of a frequency other than the usual 60 cycles, the number of the markings in the stroboscopic scale employed should be increased or cut down to correspond, as will be readily understood by those skilled in the art.

While the form of apparatus as shown is preferred, the invention is not to be limited thereto except so far as the claims may be so limited, it being understood that changes might well be made in the form and arrangement of the parts without departing from the invention.

What is claimed is:

1. A stroboscopic apparatus for use in connection with regulating the speed of a phonograph, comprising in combination a turntable having a stroboscopic scale on its bottom face, housing means shielding said scale from the light of the room, and an electric lamp mounted within said housing in position to illuminate said scale to the exclusion of other light, a window in said housing, means reflecting the image of said scale for observation through said window, said lamp being adapted to be energized by alternating current of a frequency to cause the scale markings to appear to the eye to remain stationary when the scale is rotated at a predetermined selected speed.

2. A stroboscopic apparatus for use in connection with regulating the speed of a phonograph, comprising in combination a motor and a turntable having a stroboscopic scale on its bottom face, motor housing means shielding said scale from the light of the room, said motor housing means having an opening adjacent the bottom of said turntable and having a window opening, a mirror mounted a short distance below said turntable to reflect the image of said scale through said window, and an electric lamp mounted in said motor housing means in position to illuminate said scale without illuminating said mirror and adapted to be energized by alternating current of a frequency to cause the scale markings to appear to the eye to remain stationary when the scale is rotated at a predetermined selected speed.

3. A stroboscopic apparatus for use in connection with regulating the speed of a phonograph, comprising in combination a turntable having a stroboscopic scale on its bottom face, variable speed mechanism for driving said turntable, housing means shielding said scale from the light of the room and having a window opening at one side a short distance below said turntable, a neon glow lamp adjacent to said window opening in said housing means in position to illuminate said scale and adapted to be energized by alternating current of a frequency to cause the scale markings to appear to remain stationary when the scale is rotated at a predetermined selected speed, and a mirror in position to reflect the light from said scale outwardly through said window opening.

4. A stroboscopic apparatus for use in connection with regulating the speed of a phonograph, comprising in combination a turntable having a 92 step stroboscopic scale on its bottom face, variable speed mechanism for driving said turntable, housing means shielding said scale from the light of the room and having a window opening at one side a short distance below said turntable, a neon glow lamp adjacent to said window opening in said housing means in position to illuminate said scale and adapted to be energized by 60 cycle alternating current, and a mirror in position to reflect the light from said scale outwardly through said window opening.

WILLIAM L. NIES.